United States Patent [19]
Elliott et al.

[11] Patent Number: 5,698,795
[45] Date of Patent: Dec. 16, 1997

[54] THERMAL TIME OF FLIGHT SIGNAL GUARD

[75] Inventors: John M. Elliott; Jeffrey P. Davies, both of Louisville, Colo.; Donald L. Beduhn, Madison, Wis.

[73] Assignee: Ohmeda Inc., Liberty Corner, N.J.

[21] Appl. No.: 624,068

[22] Filed: Mar. 29, 1996

[51] Int. Cl.$^6$ ........................................... G01F 1/68
[52] U.S. Cl. ........................................... 73/861.95
[58] Field of Search ........................ 73/861.95, 195, 73/204.15, 204.14

[56] References Cited

U.S. PATENT DOCUMENTS

| | | | |
|---|---|---|---|
| 3,922,912 | 12/1975 | Bradbury et al. | 73/861.95 |
| 5,347,876 | 9/1994 | Kang et al. | 73/861.95 |

FOREIGN PATENT DOCUMENTS 2210983   6/1989   United Kingdom.

OTHER PUBLICATIONS

An Evaluation of the Heat Pulse Anemometer for Velocity Measurement in Inhomogenous Turdulent Flow, Ivar H. Tombach, The Review of Scientific Instruments, vol. 44, No. 2, pp. 141–148, Feb. 1973.

A Pulsed–Wire Technique for Velocity Measurements In Highly Turbulent Flows, L.J.S. Bradbury and I.P. Castro, J. Fluid Mech., vol. 49, part 4, pp. 657–691, 1971.

*Primary Examiner*—Richard Chilcot
*Assistant Examiner*—Harshad Patel
*Attorney, Agent, or Firm*—Roger M. Rathbun; William A. Schoneman

[57] ABSTRACT

The thermal time of flight signal guard overcomes the leakage crosstalk problem encountered in prior art systems by eliminating the leakage currents in the flow transducer before they reach the temperature sensors. This is accomplished by the installation of a conductive strip into the fluid flow path, interposed between the temperature sensors and the heat source. The conductive strip intercepts any errant leakage currents that are generated by the heat source and carried by moisture which accumulates on the walls of the fluid flow path to the temperature sensor. The signals that pass through the fluid flow conduit past the conductive strip to the temperature sensors are the thermal tracer signals. Therefore, the temperature sensors operate in a leakage current free environment and the signals produced by the temperature sensors are devoid of leakage current noise.

19 Claims, 4 Drawing Sheets

THERMAL TIME OF FLIGHT SIGNAL GUARD

FIELD OF THE INVENTION

This invention relates to thermal time of flight fluid flow measurement systems and, in particular, to signal guard apparatus for eliminating spurious electrical leakage current signals which interfere with the measurement of the thermal tracers in the thermal time of flight fluid flow measurement system.

PROBLEM

It is a problem in the field of monitoring systems, and, in particular, respiratory gas monitoring systems, to precisely measure the volumetric flow of a fluid in an accurate manner without resorting to the use of complex and expensive apparatus. Existing fluid flow measurement systems typically make use of thermal time of flight measurements. Thermal time of flight is a generic description of a fluid flow sensing technique in which fluid flow is measured by timing the passage of thermal tracers, convected by the fluid flow, between two points over a known distance. The time of transit of the thermal tracers indicates the mean velocity of the fluid flow between the two measurement points and hence the fluid velocity is simply determined. For volumetric fluid flow measurements, the measurement is performed inside a flow conduit or housing of known dimensions and the volumetric fluid flow is thereby deduced from the measured velocity and the cross section of the fluid flow path. The fluid that is measured by the thermal time of flight measurement apparatus can be any material which flows and includes: liquids, gases or combinations of these (such as fogs), a solid slurry or a dust cloud (which comprises gas and solid mixture).

A single heater-sensor thermal time of flight system operates by measuring the time between the emission of a heat pulse and the arrival of the heat pulse at the sensor. The accuracy of such systems is strongly dependent on the particular thermodynamic characteristics of the gas in that changes in the rate of absorption and dispersion of the heat pulse in the gas alters the reported time of flight. The shape and formation of the heat pulse at the heater is dependent on the gas and thus the detected time of flight between the heater and the sensor can be in error depending on the characteristics of the gas. The advantage of the dual sensor system disclosed in the preferred embodiment of the invention is that the heat pulse is fully formed by the time it passes the first sensor and has the same characteristics as it passes the second sensor. Thus, the two sensor system's measurement accuracy is very independent of the particulars of the gas being measured.

An alternative system configuration positions two temperature sensors downstream of the heat source in the direction of the fluid flow to intercept the thermal tracers as they pass each temperature sensor in turn. The transit time of the thermal tracers is based only on the time difference measured between thermal tracers as derived from the two temperature sensors. A significant feature of this dual temperature sensor apparatus is that it can directly measure fluid velocity. The user can then determine not only the mean velocity of the fluid flow, but also velocity fluctuations and, hence, turbulence levels within turbulence structures that exist within the fluid flow conduit and the various degrees of directionality of this turbulence. In this application, the temperature sensor configuration is frequently referred to as a pulsed anemometer.

A significant contributor to measurement errors in thermal time of flight measurement systems is crosstalk between the heat sources and temperature sensors. Crosstalk arises from either direct conductance of the heater drive signals to the temperature sensors, or by way of capacitive and inductive coupling of the heater drive signals to the sensors. Direct conductance paths between the heater and sensors can be caused by the accumulation of humidity or conductive reaction byproducts on the inner surfaces of the flow transducer. In respiratory gas measurement systems, the presence of condensing humidity in the flow transducer is the norm. The presence of such a conductance path allows a portion of the currents normally contained on the heater to leak to the sensors and their support circuitry. Electromagnetic coupling of the heater signals to the sensor signals is caused by their proximity and imperfect shielding between their electrical circuits. Because the crosstalk signals arrive at the sensors at substantially the same time that the heater is energized rather than traveling to the sensors on the heated gas flow, they do not indicate the true time of flight of the heat pulses and thus can cause the measurement system to produce erroneous results. Additionally, because the amplitude of the crosstalk signals on the sensors can be much larger than the expected signals generated by the arrival of the heated gas pulses, the sensitive electronic amplifiers and monitoring circuits connected to the sensors can become saturated and fail to properly operate. As the leakage current path becomes more conductive, larger leakage currents contaminate the normal sensor signals and the deleterious effects of amplifier saturation become greater and greater.

Prior art thermal time of flight measurement systems have recognized the presence of electromagnetically coupled crosstalk and have described its effects on thermal time of flight measurement system performance. In particular, a paper titled "A Pulsed Wire Technique for Velocity Measurements in Highly Turbulent Flows" by L. J. S. Bradbury and I. P. Castro was published in the *Journal of Fluid Mechanics*, volume 41, pages 657–691 in 1971. In that description, the operating range of the measurement system had to be limited to low flow rates having normal heat pulse transit times longer than 100 microseconds, the decay time of the crosstalk signal. Another prior art reference is the paper titled "An Evaluation of the Heat Pulse Anemometer for Velocity Measurement in Inhomogeneous Turbulent Flow" by Ivar H. Tombach, published in *The Review of Scientific Instruments*, volume 44, pages 141–148 in 1973 which reported a crosstalk interference problem which was solved in postprocessing by first recording the sensor signal without fluid flow, and then subtracting that signal from the signal obtained with a fluid flow in order to eliminate the interference. Finally, the published United Kingdom patent application 2,210,983, titled "Gas Flowmeter for Clinical Use" by P. R. Hall and A. Noorl, uses electronic timers to detect the correct signal pulse, since the crosstalk pulse is significant but has decayed to a certain level before the thermal tracer arrives at the temperature sensor. This method again limits the operating range of the system to flows causing normal tracer transit times longer than the decay time of the crosstalk signal.

The prior art descriptions do not address crosstalk created by leakage currents conducted between the heater and sensor, and the stated solutions to the electromagnetically coupled crosstalk do not provide the means to adequately correct conductance path crosstalk. Locking out the crosstalk signals until they decay to acceptable levels, as described in the Bradbury and Hall references, unnecessarily limits the operating range of the measurement systems.

Furthermore, the time required for the sensor electronic amplifiers to come out of saturation after the crosstalk signal decays can increase the increase as the conductance of the leakage path increases, nullifying the effectiveness of fixed lockout timers and further limiting the operating range of the measurement system. Subtracting the crosstalk signal from the thermal tracer signal, as described by Tombach, will only work if the shape of the crosstalk signal remains static over time. In the case of crosstalk caused by conductance along the transducer walls, the conductivity of the path can change with operating conditions such as the flow rate and temperature, thus causing the shape of the crosstalk signal to vary with time. Attempts to inhibit conductance paths by creating moisture blocking structures or moats along the walls of the transducer have proven to be ineffective since eventually enough condensation builds up to overwhelm such barriers. Coating the temperature sensors or heaters with electrically insulating materials is also an undesirable approach to solving the leakage current crosstalk because the insulating layer reduces the sensitivity of the elements and increases their thermal response times thus severely degrading or inhibiting the operation of the measurement system. Thus, there is presently no adequate remedy for the leakage crosstalk which occurs as a result of moisture present in the flow transducer.

SOLUTION

The thermal time of flight signal guard of the present invention overcomes the leakage crosstalk problem encountered in prior art systems by eliminating the leakage currents in the flow transducer before they reach the temperature sensors. This is accomplished by the installation of a conductive strip on the inner walls of the fluid flow conduit, interposed between the temperature sensors and the heat source. The conductive strip intercepts any errant leakage currents that are generated by the heat source and carried by moisture which accumulates on the walls of the fluid flow path to the temperature sensor. Therefore, the temperature sensors operate in a leakage current free environment and the signals produced by the temperature sensors are devoid of leakage current noise.

In thermal time of flight measurement systems, the electrical signals generated by the temperature sensors are significantly less in magnitude than the electrical signals used to drive the heat source, a difference typically on the order of 10,000 times the magnitude in respective signal amplitudes. Due to this great disparity in signal magnitudes, a small amount of electrical signal conduction from the heat source to the temperature sensors can swamp the actual measured thermal energy at the temperature sensors. Thus, the leakage currents that pass from the heat source and the temperature sensors due to the presence of moisture in the flow path can significantly impact the quality of the thermal signal measurement and the resultant fluid flow velocity measurement.

In the preferred embodiment of the invention, the flow transducer of the thermal time of flight measurement system is implemented as part of a respiratory gas flow path. Typically, the flow transducer is cylindrical in nature and is implemented in two segments, each being substantially a semi-cylindrical segment which, when the two semi-cylindrical segments are joined together, form the cylindrical fluid flow conduit. In one of the substantially semi-cylindrical segments, a heat source comprising a heater element is installed and extends from one cylinder wall to the other cylinder wall. Two temperature sensing elements are located downstream of the heater element and also extend from one cylinder wall to the other cylinder wall. The other substantially semi-cylindrical segment of the fluid flow conduit is implemented without any temperature sensor elements or heater element. A conductive strip is formed on both substantially semi-cylindrical segments of the fluid flow conduit such that when the two segments of the flow transducer of the thermal time of flight measurement system are assembled, the conductive strip conforms to the inside surface of fluid flow conduit and presents an electrically conductive barrier between the heater element and temperature sensor elements to thereby block the flow of any leakage currents therebetween.

It is obvious that other implementations of the signal guard can be produced and the implementation of the signal guard illustrated in the preferred embodiment of the invention shows the conductive strip located substantially midway between the heater and temperature sensor, although this particular positioning is not required for the operation of the apparatus, but simply represents a fabrication convenience. In a bidirectional flow thermal time of flight measurement system, the conductive strip must be interposed between each heater and adjacent temperature sensor element combination to prevent crosstalk in both directions on this bidirectional flow path.

DETAILED DESCRIPTION

The preferred embodiment of the thermal time of flight measurement system is designed for installation in a medical monitoring instrument. In the preferred embodiment of the invention, the fluid whose flow is being measured is a gas, such as respiratory or anesthetic gas. The thermal time of flight measurement system must be minimally intrusive in that the thermal time of flight measurement system should not introduce impedance to the fluid flow in the fluid flow path, or induce turbulence in the fluid flow, or change the thermal characteristics of the fluid being measured.

The thermal time of flight system of the present invention includes a signal guard to intercept the leakage currents which cause the leakage current crosstalk problem of the prior art before these leakage currents reach the temperature sensors. The preferred embodiment of this thermal time of flight system 1 is illustrated in exploded diagram form in FIG. 1. The thermal time of flight measurement system 1 comprises a control circuit portion 2 and a flow transducer portion 3. In the preferred embodiment of the invention disclosed in the attached figures, the thermal time of flight measurement system 1 is implemented such that the flow transducer portion 3 of the system is part of the fluid flow channel, termed the fluid flow conduit 10 herein.

Figure 1:
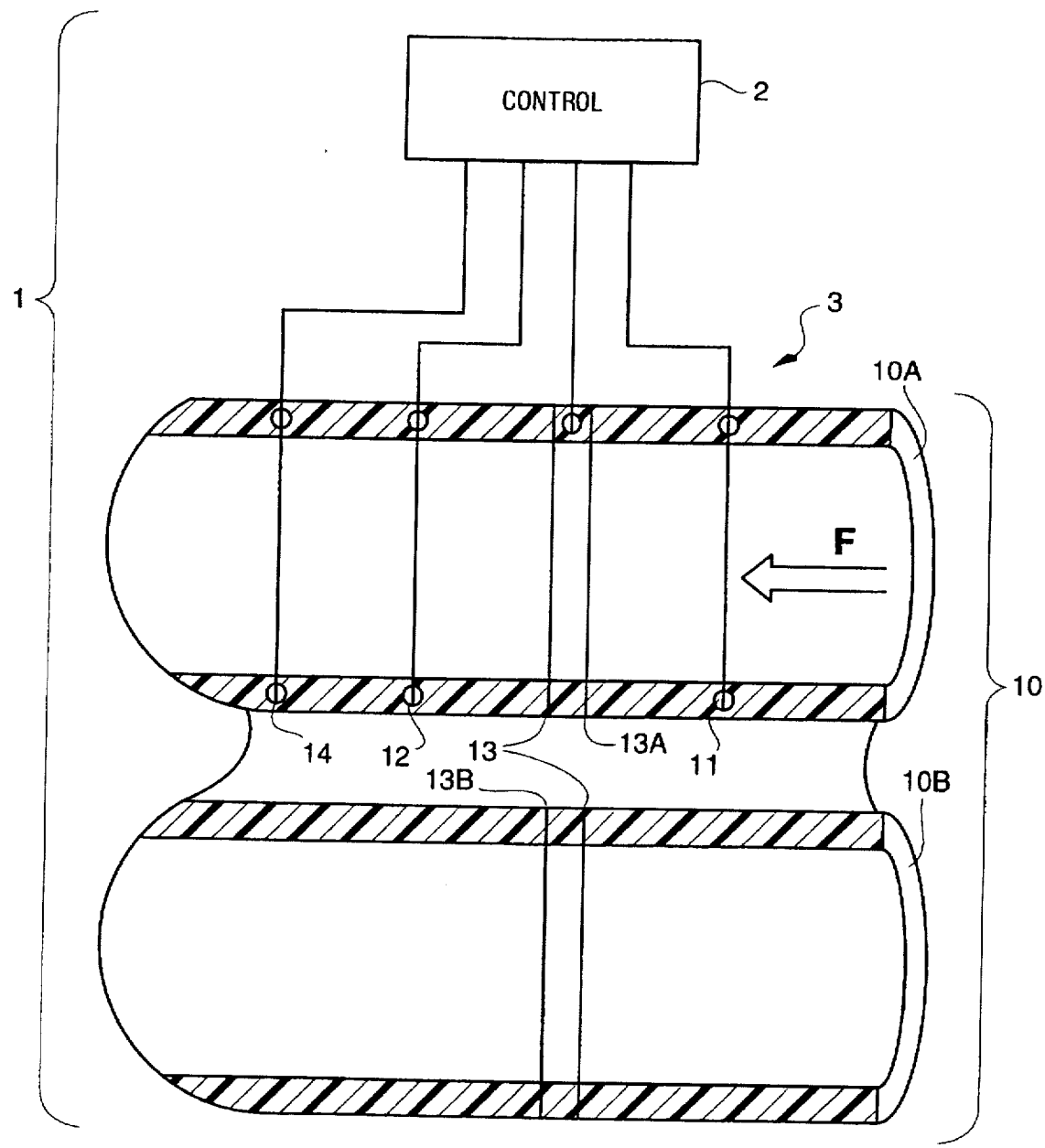
FIG. 1 illustrates an exploded view of the thermal time of flight measurement system of the preferred embodiment of the present invention.

Typically, the fluid flow conduit 10 is cylindrical in geometry, with the length dimension (along the axis of the cylinder) being the direction of fluid flow as indicated by arrow F in FIG. 1. In addition, FIG. 1 illustrates the cylindrical fluid flow conduit 10 being implemented in two segments 10A, 10B, each being substantially a semi-cylindrical segment which, when the two semi-cylindrical segments are joined together, form the cylindrical fluid flow conduit 10. In one of the substantially semi-cylindrical segments 10A, a heat source comprising a heater element 11 is installed and extends from one cylinder wall to the other cylinder wall. The heater element 11 releases a controllable amount of thermal energy into the fluid flow channel 10 to form the thermal tracers to heat the fluid as the fluid is transported through the fluid flow conduit 10 along said length dimension in the predetermined fluid flow direction. A temperature sensor comprising temperature sensor elements 12 and 14 is located downstream of the heater element 11 and also extends from one cylinder wall to the other cylinder wall. The other substantially semi-cylindrical segment 10B of the fluid flow conduit 10 is implemented without any temperature sensor element or heater element. A conductor comprising conductive strip 13 is formed on both substantially semi-cylindrical segments 10A, 10B of the fluid flow conduit 10 such that when the two segments 10A, 10B of the thermal time of flight measurement system 1 are assembled, the conductive strip 13 conforms to the inside surface of fluid flow conduit 10 and presents an electrically conductive barrier between the heater element 11 and temperature sensor elements 12, 14 to thereby divert the flow of any electrical signals therebetween.

There are advantages to using two temperature sensors 12, 14 over a single sensor embodiment. The two temperature sensors 12, 14, if implemented in identical fashion, eliminate the temperature sensor thermal response time effects since the responsiveness of both temperature sensors 12, 14 are identical and the difference in measurements between the two temperature sensors 12, 14 subtract out the thermal response time, thereby providing a response that is independent of temperature sensor characteristics. Single temperature sensor systems must wait for each pulse of thermal energy to decay so that an ambient temperature is reached before initiating the successive pulse. This limitation creates a limit to the response time that can be created using this configuration. With a dual temperature sensor system, the thermal time of flight measuring system can be operated at a much higher frequency to give a faster response time and have a greater repeatability of performance and a higher flow rate and dynamic range capability. The single temperature sensor systems tend to employ rapid heating to have a more distinctive thermal response which leads to high thermal stress on the heater element 11. In contrast, the dual temperature sensor systems achieve peak heater element temperatures over a much longer time interval, thus reducing the instantaneous power.

In operation, the control circuit 2 monitors the signals produced by the temperature sensor elements 12, 14 to thereby determine the temperature of the fluid that flows in the direction indicated by arrow F in the fluid flow conduit 10. The control circuit 2 also produces drive signals which are applied to the heater element 11 to produce the thermal tracers. The installation of a conductive strip 13 in the fluid flow path, interposed between the temperature sensor elements 12, 14 and the heater element 11, intercepts any errant leakage currents that are generated by the heater element 11 and the signals that pass the conductive strip 13 to the temperature sensor elements 12, 14 are therefore the thermal tracer signals. The electrical signals generated by the temperature sensor elements 12, 14 are typically 50 nA in magnitude, which is significantly less than the magnitude of the electrical signals (200 mA) produced by the control circuit 2 to drive the heater element 11. Due to this great disparity in signal magnitudes, a small amount of signal conduction (up to 50 µA) from the heater element 11 to the temperature sensor elements 12, 14 can swamp the actual measured thermal energy at the temperature sensor elements 12, 14 by introducing noise to the temperature sensor elements 12, 14 output signal. Thus, the leakage currents that pass between the heater element 11 and the temperature sensor elements 12, 14 can significantly impact the quality of the thermal signal measurement.

Conductive Strip

It is obvious that other implementations of the conductive strip 13 can be produced and the implementation illustrated in FIG. 1 shows the conductor strip 13 located substantially midway between the heater element 11 and temperature sensor element 12, although this particular positioning is not required for the operation of the apparatus, but simply represents a fabrication convenience. In addition, the relative spacing of the heater element 11 and the two temperature sensor elements 12, 14 are not shown to scale, since the diagrams are simply for the purpose of illustration. The conductive strip 13 must be positioned to intercept the leakage currents which travel along the interior walls of the fluid flow conduit 10 from the heater element 11 to the temperature sensor elements 12, 14. The conductive strip 13 must therefore conform to the geometry and shape of the interior walls of the fluid flow conduit 10.

In addition, since the conductive strip 13 intercepts the leakage currents that flow through the conductive path formed by the presence of moisture which accumulates on the inner surfaces of flow conduit 10, these leakage currents can be passed to signal ground to thereby eliminate these leakage currents. Alternately, the leakage currents can be directed to a current sensor circuit (not shown) which is part of the control circuit 2 so that the magnitude of the leakage currents can be measured. The magnitude of the leakage current may not precisely correspond to the magnitude of moisture present on the inner surfaces of the flow conduit 10, but does indicate whether the moisture accumulation is sufficient to alter the effective flow cross-section of the flow conduit 10. The restriction of the flow cross-section can enable the user or the control circuit 2 to alter the value of the measured fluid flow to compensate for the reduced flow cross-section.

Bidirectional Flow Temperature Sensor Systems

Figure 4:
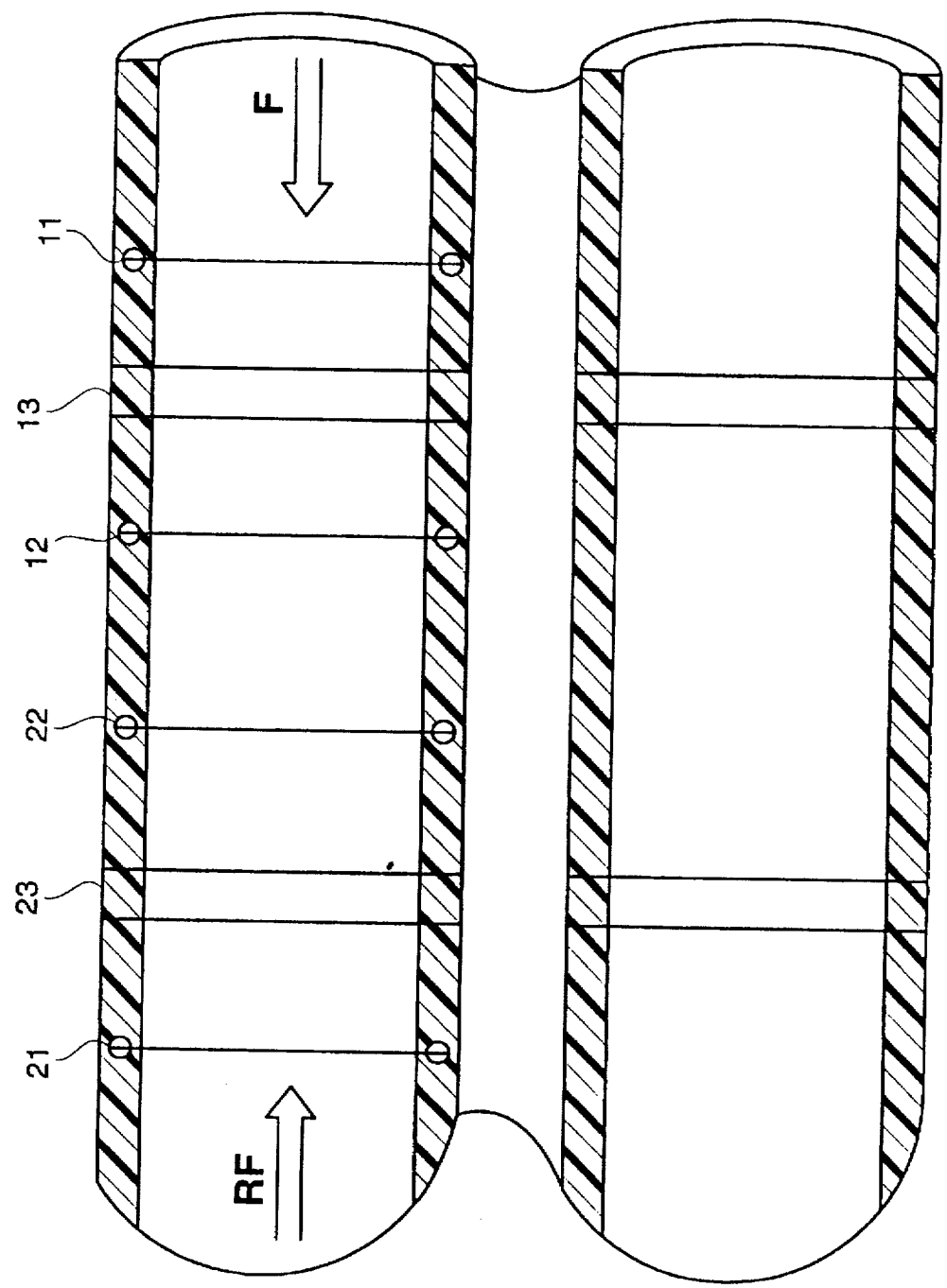
FIG. 4 illustrates the preferred embodiment of a bidirectional flow temperature sensor embodiment of the thermal time of flight measurement system of the present invention.

An alternative thermal time of flight system configuration, illustrated in FIG. 4, positions two sets of temperature sensors 12 and 22 downstream of the heat sources 11 and 21 in the direction of the fluid flow (F and RF, respectively) to intercept the thermal tracers as they pass each of the temperature sensor elements 12 and 22 as a function of the direction of fluid flow. This configuration is spatially symmetrical and allows full operation in either fluid flow direction. The bidirectionality can be a significant advantage in medical monitoring applications since bidirectional operation can be used to measure both inhalations and exhalations using the same apparatus. The dual heater embodiment affords the opportunity for performing additional clinical functions such as real-time metabolics in conjunction with real-time gas analysis and real-time lung mechanics measuring. In the bidirectional flow sensor arrangement, the conductive strips 13, 23 must be interposed between each heater element 11, 21 and the adjacent temperature sensor elements 12, 22 to prevent crosstalk in both directions on this bidirectional flow path.

Figure 5:
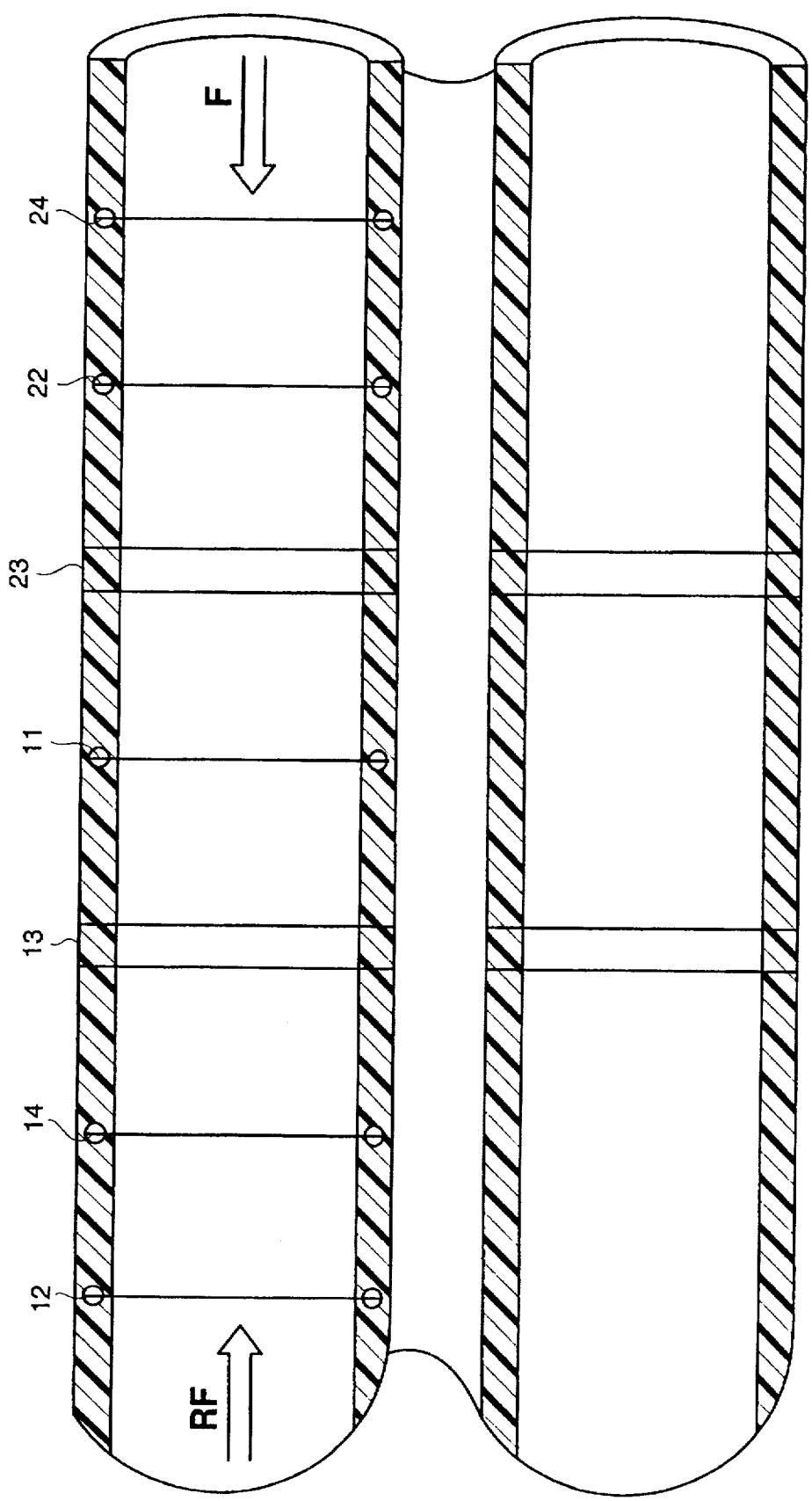
FIG. 5 illustrates an alternative embodiment of a bidirectional flow temperature sensor embodiment of the thermal time of flight measurement system of the present invention.

An alternative bidirectional system configuration, illustrated in FIG. 5, positions two sets of temperature sensors 12, 14 and 22, 24 downstream of the heat source 11 in the direction of the fluid flow (F and RF, respectively) to intercept the thermal tracers as they pass each pair of temperature sensor elements 12, 14, and 22, 24 in turn, as a function of the direction of fluid flow. The transit time of the thermal tracers is based only on the time difference measured between thermal tracers as derived from the two temperature sensor elements 12, 24 and 22, 24 contained in each temperature sensor.

The dual temperature sensor element 12, 22 configuration is illustrated in exploded diagram form in FIG. 4 to illustrate how this configuration can be adapted for bidirectional flow measurement by the addition of another pair of temperature sensor elements 22, 24 in the fluid flow path distal from the first temperature sensor 12, 22 pair so that the configuration of elements in the fluid flow path is sensor-sensor-heater-sensor-sensor. Alternatively, another heat source (not shown) can be added in the fluid flow path adjacent to the first heat source so that the configuration of elements is sensor-sensor-heater-heater-sensor-sensor. These configurations are spatially symmetrical and allow full operation in either fluid flow direction. The bidirectionality can be a significant advantage in medical monitoring applications since bidirectional operation can be used to measure both inhalations and exhalations using the same apparatus. The dual heater embodiment affords the opportunity for performing additional clinical functions such as real-time metabolics in conjunction with real-time gas analysis and real-time lung mechanics measuring. In the bidirectional flow sensor arrangement, the conductive strip 13 must be interposed between each heater element 11 and the adjacent temperature sensor elements 12, 14 and 22, 24 to prevent crosstalk in both directions on this bidirectional flow path.

Waveform Diagrams

Figure 2:
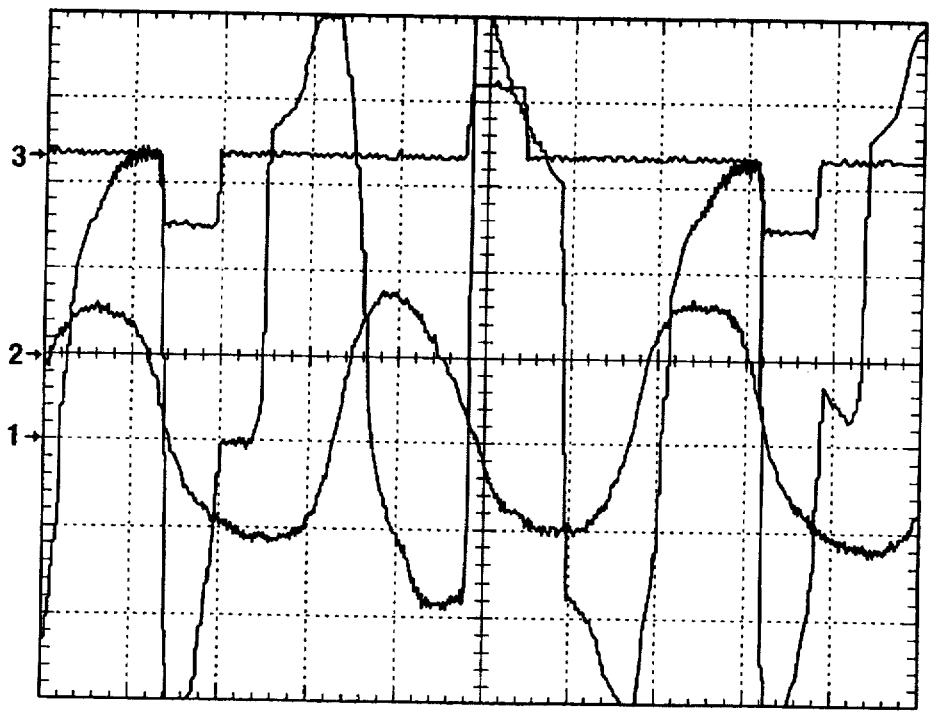
FIG. 2 illustrates a number of signal waveforms to illustrate signal characteristics in a typical prior art thermal time of flight measurement system.
Figure 3:
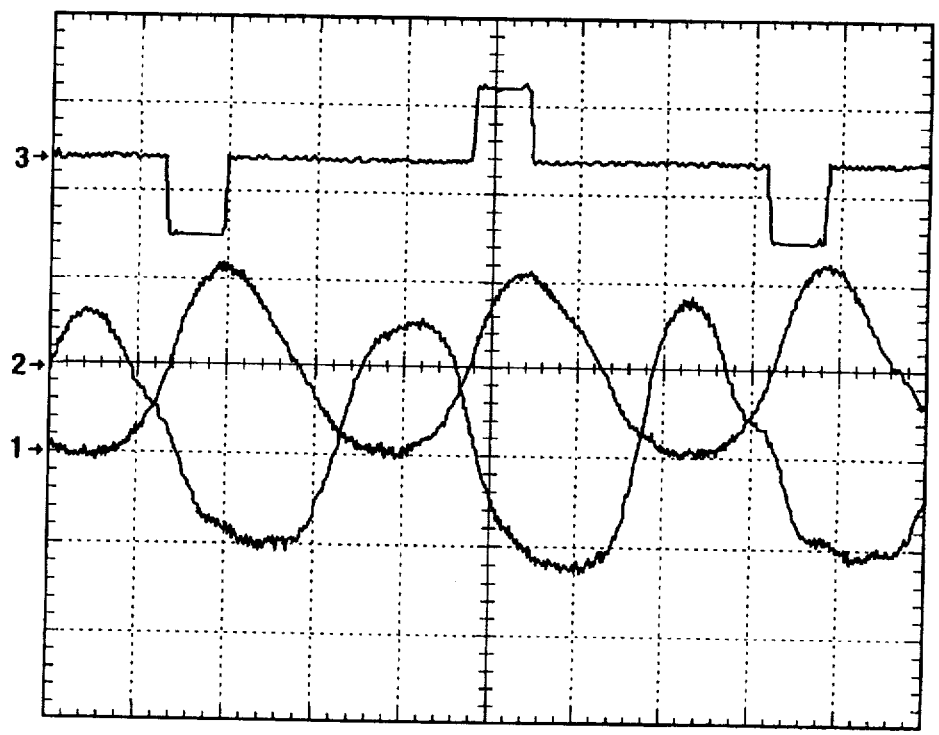
FIG. 3 illustrates a number of signal waveforms to illustrate signal characteristics in the thermal time of flight measurement system of the preferred embodiment of the present invention.

FIGS. 2 and 3 illustrate signal waveform diagrams for a thermal time of flight measurement system 1 absent the conductive strip 13 and equipped with the conductive strip 13, respectively. As shown in FIGS. 2 and 3, the three waveforms, labeled 1, 2, 3, represent the first temperature sensor element output signal, the second temperature sensor element output signal, and the drive signal for the heat source 11, respectively. As can be seen by comparing the waveforms of FIGS. 2 and 3, the presence of the conductive strip 13 effectively eliminates the leakage currents present in the system of FIG. 2. The resultant temperature sensor element waveforms (waveforms 1, 2 of FIG. 3) precisely track the heat source drive signal and represent time shifted versions of the same signal with a time of flight delay component added thereto, which enables the control circuit portion 2 of the thermal time of flight measurement system 1 to accurately determine the fluid flow. Thus, the time difference between the peaks of waveform 1 and waveform 2 of FIG. 3 represents the time of flight of the fluid flowing in direction F in the flow path of the flow transducer 3.

We claim:

1. A fluid flow measurement apparatus for determining a velocity of a fluid in a channel, comprising:

a fluid flow channel having a length dimension for transporting a fluid along said length dimension in a predetermined direction;

heat source means located in said fluid flow channel for releasing a controllable amount of thermal energy into said fluid flow channel;

sensor means located in said fluid flow channel for measuring a temperature of said fluid as said fluid is transported through said fluid flow channel along said length dimension in said predetermined direction; and means, interposed between said heat source means and said sensor means, for intercepting electrical leakage signals generated by said heat source means.

2. The fluid flow measurement apparatus of claim 1 wherein said sensor means comprises:

a first temperature flow transducer element for measuring a temperature of said fluid as said fluid is transported through said fluid flow channel along said length dimension in said predetermined direction.

3. The fluid flow measurement apparatus of claim 2 wherein said heat source means comprises:

a first thermal source for releasing a controllable amount of thermal energy into said fluid flow channel to heat said fluid a predetermined amount as said fluid is transported through said fluid flow channel along said length dimension in said predetermined direction.

4. The fluid flow measurement apparatus of claim 3 wherein said intercepting means comprises:

a first conductor, located in said fluid flow path, and of a geometry and extent to prevent conductance of electrical signals emanating from said first thermal source to said first temperature flow transducer.

5. The fluid flow measurement apparatus of claim 4 wherein said first conductor conforms to inside dimensions of said fluid flow channel.

6. The fluid flow measurement apparatus of claim 3 wherein said sensor means further comprises:

a second temperature flow transducer, located in said fluid flow path on a side of said first temperature flow transducer distal from said first thermal source, for measuring a temperature of said fluid as said fluid is transported through said fluid flow channel along said length dimension in said predetermined direction.

7. The fluid flow measurement apparatus of claim 6 wherein said heat source means further comprises:

a second thermal source, located in said fluid flow path on a side of said second temperature flow transducer distal from said first thermal source, for releasing a controllable amount of thermal energy into said fluid flow channel to heat said fluid a predetermined amount as said fluid is transported through said fluid flow channel along said length dimension in a direction opposite said predetermined direction;

a second conductor, located in said fluid flow path, and of a geometry and extent to prevent conductance of electrical signals emanating from said second thermal source to said second temperature flow transducer; and Wherein said first and said second temperature flow transducers measure a temperature of said fluid as said fluid is transported through said fluid flow channel along said length dimension in both said predetermined direction and in a direction opposite said predetermined direction.

8. The fluid flow measurement apparatus of claim 7 wherein said first conductor conforms to inside dimensions of said fluid flow channel.

9. The fluid flow measurement apparatus of claim 3 wherein said sensor means further comprises:

a second temperature flow transducer, located in said fluid flow path on a side of said first thermal source distal from said first temperature flow transducer, for measuring a temperature of said fluid as said fluid is transported through said fluid flow channel along said length dimension in a direction opposite of said predetermined direction.

10. The fluid flow measurement apparatus of claim 9 wherein said intercepting means further comprises:

a second conductor, located in said fluid flow path, and of a geometry and extent to prevent transmission of electrical signals emanating from said first thermal source to said second temperature flow transducer.

11. The fluid flow measurement apparatus of claim 10 wherein said second conductor conforms to inside dimensions of said fluid flow channel.

12. The fluid flow measurement apparatus of claim 10 wherein said second conductor means transmits said electrical leakage signals generated by said heat source means to a signal ground.

13. The fluid flow measurement apparatus of claim 10 wherein said second conductor transmits said electrical leakage signals generated by said heat source means to a leakage signal measurement circuit to determine a magnitude of said leakage signal.

14. The fluid flow measurement apparatus of claim 9 wherein said sensor means further comprises:

a third temperature flow transducer, located in said fluid flow path on a side of said second temperature flow transducer distal from said first thermal source, for measuring a temperature of said fluid as said fluid is transported through said fluid flow channel along said length dimension in said direction opposite said predetermined direction.

15. The fluid flow measurement apparatus of claim 1 wherein said intercepting means comprises:

a conductor, located in said fluid flow path, and of a geometry and extent to prevent transmission of electrical signals emanating from said heat source means to said sensor means.

16. The fluid flow measurement apparatus of claim 15 wherein said conductor conforms to inside dimensions of said fluid flow channel.

17. The fluid flow measurement apparatus of claim 1 wherein said intercepting means transmits said electrical leakage signals generated by said heat source means to a signal ground.

18. The fluid flow measurement apparatus of claim 1 wherein said intercepting means transmits said electrical leakage signals generated by said heat source means to a leakage signal measurement circuit to determine a magnitude of said leakage signal.

19. The fluid flow measurement apparatus of claim 1 further comprising:

means for computing fluid velocity as a function of said controllable amount of thermal energy released into said fluid flow path and said measured temperature.

* * * * *